US008997501B2

(12) United States Patent
Cihlar et al.

(10) Patent No.: US 8,997,501 B2
(45) Date of Patent: Apr. 7, 2015

(54) SYSTEM FOR MOUNTING COMBUSTOR TRANSITION PIECE TO FRAME OF GAS TURBINE ENGINE

(75) Inventors: David William Cihlar, Greenville, SC (US); Patrick Benedict Melton, Horse Shoe, NC (US); John Drake Vanselow, Taylors, SC (US)

(73) Assignee: General Electric Company, Schenectady, NY (US)

(*) Notice: Subject to any disclaimer, the term of this patent is extended or adjusted under 35 U.S.C. 154(b) by 978 days.

(21) Appl. No.: 13/152,117

(22) Filed: Jun. 2, 2011

(65) Prior Publication Data

US 2012/0304664 A1 Dec. 6, 2012

(51) Int. Cl.

| | |
|---|---|
| ***F02C 7/20*** | (2006.01) |
| ***F02C 1/00*** | (2006.01) |
| ***F01D 9/02*** | (2006.01) |

(52) U.S. Cl.

CPC .......... *F01D 9/023* (2013.01); *F05D 2250/411* (2013.01); *F05D 2260/30* (2013.01)

(58) Field of Classification Search

USPC ..................... 60/752–760, 796–800; 431/343

See application file for complete search history.

(56) References Cited

U.S. PATENT DOCUMENTS

| | | | | |
|---|---|---|---|---|
| 4,422,288 | A * | 12/1983 | Steber | 60/800 |
| 5,414,999 | A | 5/1995 | Barnes | |
| 6,216,442 | B1 * | 4/2001 | Belsom et al. | 60/797 |
| 6,442,946 | B1 * | 9/2002 | Kraft et al. | 60/796 |
| 6,662,567 | B1 | 12/2003 | Jorgensen | |
| 7,082,766 | B1 * | 8/2006 | Widener et al. | 60/752 |
| 2005/0241321 | A1 * | 11/2005 | Martling et al. | 60/796 |
| 2007/0033941 | A1 * | 2/2007 | Riggi et al. | 60/752 |
| 2009/0145137 | A1 | 6/2009 | Rizkalla et al. | |
| 2009/0188258 | A1 | 7/2009 | Rizkalla et al. | |
| 2009/0249791 | A1 * | 10/2009 | Belsom | 60/755 |
| 2010/0199677 | A1 * | 8/2010 | Figueroa et al. | 60/752 |

OTHER PUBLICATIONS

EP Search Report and Written Opinion dated Mar. 13, 2014 issued in connection with corresponding EP Application No. 12169885.6.

* cited by examiner

*Primary Examiner* — Gerald L Sung

(74) *Attorney, Agent, or Firm* — Fletcher Yoder, P.C.

(57) ABSTRACT

A system includes a combustor transition piece configured to mount between a combustor and a turbine of a gas turbine engine. The combustor transition piece includes a hollow body with an internal flow passage extending from an upstream end portion to a downstream end portion. The combustor transition piece also includes an aft frame coupled to the downstream end portion of the hollow body, an aft flange coupled to the aft frame, and a mounting lug removably coupled to the aft frame at a first joint. The mounting lug is configured to removably couple to a mounting bracket at a second joint.

21 Claims, 4 Drawing Sheets

FIG. 3
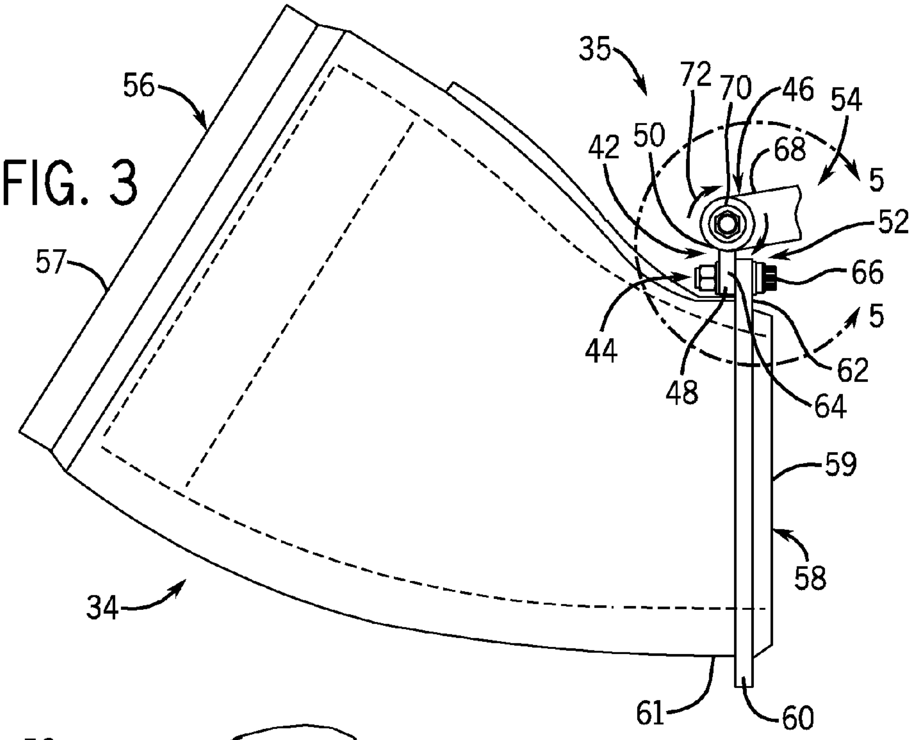
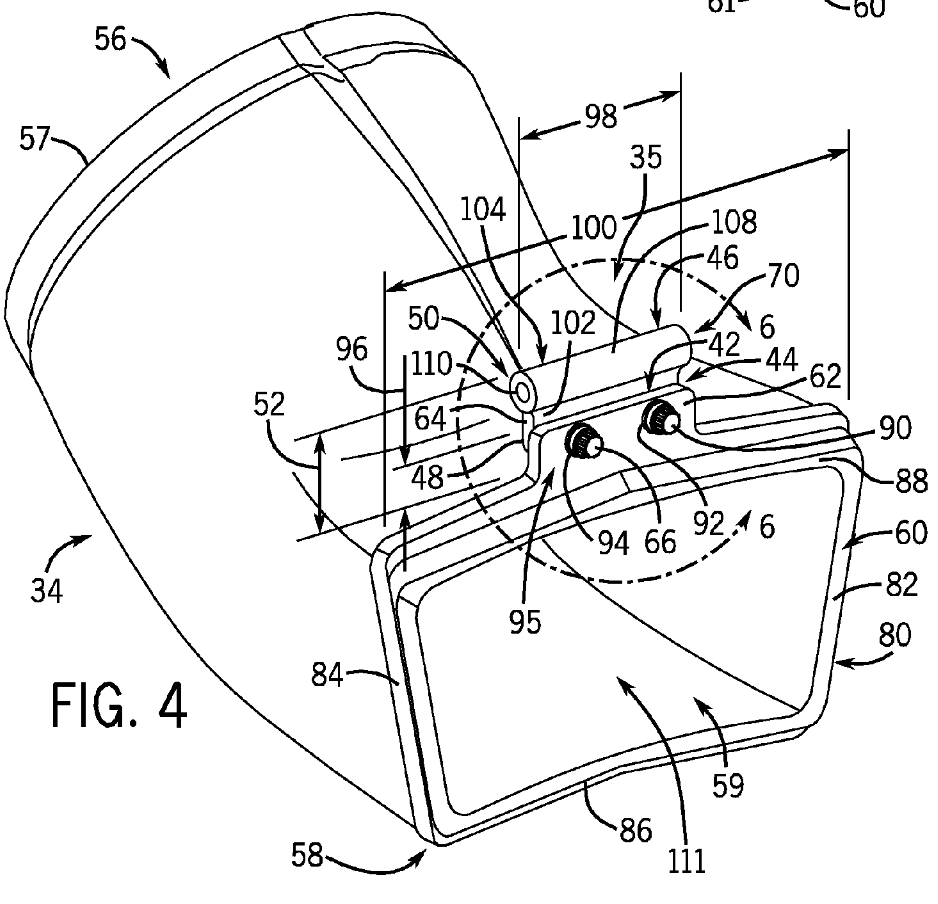
FIG. 4

SYSTEM FOR MOUNTING COMBUSTOR TRANSITION PIECE TO FRAME OF GAS TURBINE ENGINE

BACKGROUND OF THE INVENTION

The disclosed subject matter relates to a gas turbine engine, and more specifically to a system for mounting a combustor transition piece to a frame of the gas turbine engine.

A gas turbine engine includes at least one combustor, which includes a transition piece leading from a combustion zone toward a nozzle of a turbine. The transition piece is typically coupled to a frame, e.g., an aft frame, of the gas turbine engine with an integral mount (e.g., welded in place). For example, the integral mount may extend between the transition piece and the frame in a fixed orientation. Unfortunately, the integral mount may block certain areas requiring access for assembly, service, maintenance, and other operations. For example, the integral mount may block access for a welding operation. Given that the integral mount is fixed in position, the integral mount cannot be removed to provide access for these operations.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a combustor transition piece configured to mount between a combustor and a turbine of a gas turbine engine. The combustor transition piece includes a hollow body comprising an internal flow passage extending from an upstream end portion to a downstream end portion, an aft frame coupled to the downstream end portion of the hollow body, an aft flange coupled to the aft frame, a mounting lug removably coupled to the aft frame at a first joint. The mounting lug is configured to removably couple to a mounting bracket at a second joint.

In a second embodiment, a system includes a gas turbine engine including a combustor, a turbine, a combustor transition piece, and an aft mounting system. The combustor transition piece extends between the combustor and the turbine. The aft mounting system includes a removable mounting lug, which mounts an aft portion of the combustor transition piece to a mounting bracket of the gas turbine engine. The removable mounting lug includes a first removable joint coupled to the aft portion and a second removable joint coupled to the mounting bracket.

In a third embodiment, a system includes an aft mounting system configured to support a combustor transition piece between a combustor and a turbine of a gas turbine engine. The aft mounting system includes a removable mounting lug with opposite first and second end portions, a first joint disposed at the first end portion, and a second joint disposed at the second end portion. The first joint includes a first removable fastener, and is configured to removably couple the removable mounting lug to an aft flange of the combustor transition piece. The second joint includes a rotational joint having a second removable fastener, and is configured to removably couple the removable mounting lug to a mounting bracket on the gas turbine engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a cross-sectional side view of the combustor transition piece of FIG. 2, taken within line 3-3 of FIG. 2, illustrating an embodiment of the selectively removable aft mounting system selectively coupled to the transition piece;

FIG. 4 is a perspective view of the combustor transition piece of FIG. 2, illustrating the selectively removable aft mounting system coupled to the transition piece;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed further below, the disclosed embodiments include a selectively removable aft mounting system for a transition piece of a turbine combustor. In particular, the aft mounting system includes at least one removable mounting portion (e.g., mounting lug) between the transition piece (e.g., aft frame of the transition piece) and a turbine casing of a gas turbine engine. The removable mounting portion is selectively removable to provide additional access space between the transition piece and the aft frame and/or turbine casing, thereby aiding various operations in the space. Thus, rather than hindering these operations with an integral mount (e.g., welded in place) that permanently blocks the space, the removable mounting portion essentially acts like a removable access panel to improve the accessibility and serviceability of the space. In other words, the removable mounting portion is multi-functional, acting both as a removable mount and a removable access panel. In certain embodiments, as discussed in detail below, the removable mounting portion may include at least two joints, such as a first mounting joint coupled to the transition piece (e.g., aft frame of the transition piece) and a second mounting joint coupled to the turbine casing. Each joint may include one or more removable fasteners, such as bolts, pins, flanges, hooks, or other separable features. Furthermore, at least one of the joints may include a rotational joint, such as a hinged joint, which enables rotational movement between the transition piece and the frame. However, a variety of removable mounting portions and joints may be employed within the scope of the disclosed embodiments.

Figure 1:
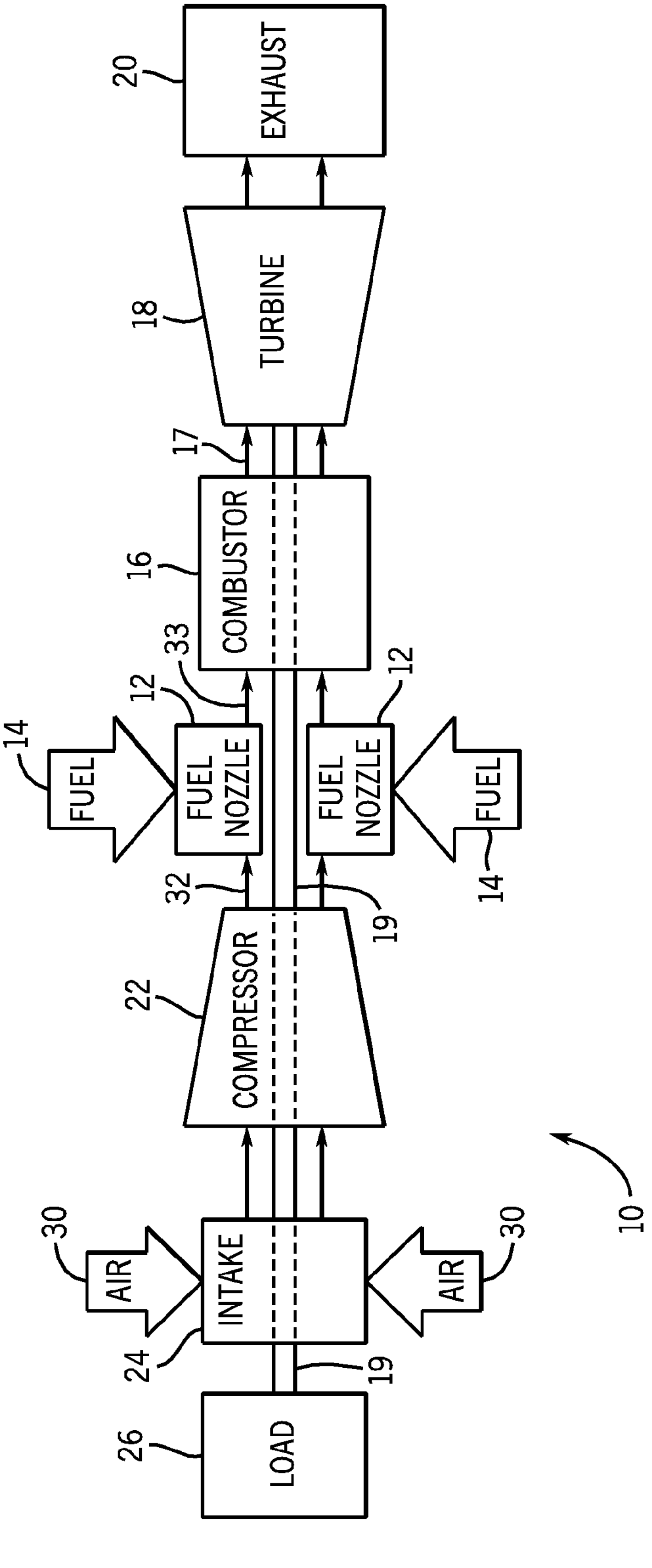
FIG. 1 is a block diagram of an embodiment of a turbine system having a selectively removable aft mounting system for a combustor transition piece.

Turning now to the drawings, FIG. 1 illustrates a block diagram of an embodiment of a gas turbine system 10. The diagram includes fuel nozzles 12, a fuel supply 14, and a combustor 16. As depicted, the fuel supply 14 routes a liquid fuel and/or gas fuel, such as natural gas or syngas, to the turbine system 10 through the fuel nozzle 12 and into the combustor 16. The combustor 16 ignites and combusts the fuel-air mixture, and then passes hot pressurized combustion gases 17 (e.g., exhaust) into a turbine 18, through a transition piece. The transition piece is mounted to the turbine system 10 via a selectively removable mounting system. The selectively removable mounting system may be removed from the transition piece when access to the underlying components of the transition piece is desired (i.e., for repair). The turbine 18 includes turbine blades coupled to a shaft 19, which is also coupled to several other components throughout the turbine system 10. As the combustion gases 17 pass through the turbine blades in the turbine 18, the turbine 18 is driven into rotation, which also causes the shaft 19 to rotate. Eventually, the combustion gas 17 exits the turbine system 10 via an exhaust outlet 20.

Similar to the turbine 18, the compressor 22 includes compressor blades coupled to the shaft 19, such that the compressor blades rotate as the turbine 18 drives rotation of the shaft 19. Further, the shaft 19 may be coupled to a load 26, which may be powered via rotation of the shaft 19. By way of example, the load 26 may be any suitable device that may generate power via the rotational output of the turbine system 10, such as a power generation plant or an external mechanical load. For instance, the load 26 may include an electrical generator, a propeller of an airplane, and so forth. The compressor 22 receives and compresses air 30 from an air intake 24 to produce a compressed air 32, which is delivered to the fuel nozzles 12 and combustor 16. Each fuel nozzle 12 may then mix the compressed air 32 and fuel 14 to produce a fuel air mixture 33, which is delivered to the combustor 16. The mixture 33 then combusts in the combustor 16 to generate hot combustion gases, which flow through the transition piece into the turbine 18 to drive the turbine blades. Again, as mentioned above, the disclosed embodiments provide an aft mounting system for the transition piece, wherein at least one mounting portion is removable to provide access for various operations.

Figure 2:
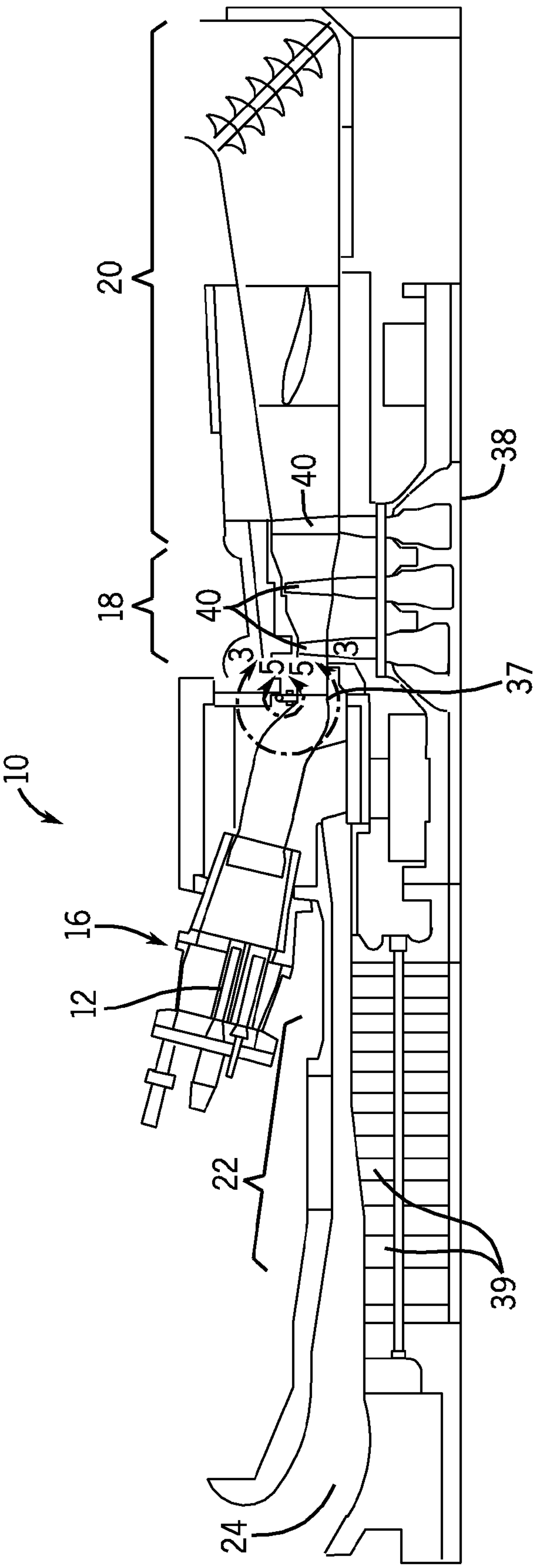
FIG. 2 is a cross-sectional side view of an embodiment of the turbine system of FIG. 1, illustrating a selectively removable aft mounting system disposed on the combustor transition piece.

FIG. 2 shows a cutaway side view of an embodiment of the turbine system 10 of FIG. 1. As depicted, the embodiment includes the compressor 22, which is coupled to an annular array of combustors 16 (e.g., 6, 8, 10, 12 or more combustors 16). Each combustor 16 includes at least one fuel nozzle 12 (e.g., 1, 2, 3, 4, 5, 6, 7, 8, 9, 10, or more), which feeds an air-fuel mixture to a combustion chamber located within each combustor 16. The combustor 16 is connected to the turbine 18 via a transition piece 34. In operation, the air-fuel mixture combusts and generates hot combustion gases in the combustor 16. These gases then flow through the transition piece 34 into the turbine 18, e.g., a turbine input or nozzle 37. Inside the turbine 18, the combustion gases drive turbine blades 40 to rotate about a longitudinal rotational axis 38, thereby driving the load 26 and compressor blades 39 in the compressor 22. The transition piece 34 is mounted to the turbine system 10 via a selectively removable aft mounting system 35. When removed, the aft mounting system 35 provides access to the underlying area 36 for maintenance, repair, or other operations. These features will be illustrated and described in more detail with respect to FIGS. 3-6 below.

FIG. 3 is a cross-sectional side view of the transition piece 34 of FIG. 2, as taken within line 3-3 of FIG. 2, illustrating an embodiment of the selectively removable aft mounting system 35 selectively coupled to the transition piece 34. As discussed in detail below, the aft mounting system 35 includes a removable mounting portion 42, a first joint or connection assembly 44, and a second joint or connection assembly 46. The first and second joints 44 and 46 are disposed on opposite first and second end portions 48 and 50 of the removable mounting portion 42. Upon removal or disengagement of the first and second joints 44 and 46, the removable mounting portion 42 may be removed to enable easy access, service, or repair in an aft area or gap 52 between the transition piece 34 and a turbine casing or framework 54. For example, the removable mounting portion 42 may be removed during welding operations along the aft area 52 of the transition piece 34.

As illustrated, the transition piece 34 has a combustor end 56 (e.g., upstream end portion) with a first opening 57, a turbine end 58 (e.g., downstream or aft end portion) with a second opening 59, and a hollow body 111 with an internal flow passage extending from the combustor end 56 to the turbine end 58. The combustor end 56 is configured to couple to an output of the combustor 16, while the turbine end 58 is configured to couple to the input 37 (e.g., turbine nozzle) of the turbine 18. An aft frame 60 with an integrated flange 62 surrounds an opening 59 at the turbine end 58. In certain embodiments, the aft frame 60 is integral with and/or fixedly coupled to the turbine end 58 of the transition piece 34. For example, the aft frame 60 may be welded to the turbine end 58 about a circumference 61 of the transition piece 34. The integrated flange 62 may protrude slightly away from the transition piece 34, while not completely extending across the aft area or gap 52.

Rather than a fixed structure permanently blocking the aft area or gap 52, the removable mounting portion 42 is designed to be selectively installed or removed across the gap 52. As illustrated, the removable mounting portion 42 includes a mounting arm, extension, or lug 64 to selectively bridge the gap 52. The mounting lug 64 couples to the integrated flange 62 of the aft frame 60 with the first joint 44, which may include one or more fasteners 66. For example, the fasteners 66 may include threaded fasteners, bolts, pins, hooks, dovetail joints, movable joints (e.g., rotatable joints), or other removable fasteners, rather than fixed joints such as welds. Likewise, the mounting lug 64 couples to a mounting bracket 68 of the turbine casing 54 with the second joint 46, which may include one or more fasteners 70. For example, the fasteners 70 may includes bolts, pins, hooks, dovetail joints, movable joints (e.g., rotatable joints), or other removable fasteners, rather than fixed joints such as welds. In certain embodiments, at least one or both of the joints 44 and 46 may include a movable joint, such as a rotatable joint, to enable some freedom of movement. For example, the second joint 46 may include a rotatable joint, such as a hinged joint, such that the lug 64 can move about an axis of the joint 46 as indicated by arrows 72. In this manner, the rotation at joint 46 may accommodate thermal expansion and contraction, or other movement, in the turbine system 10.

During assembly, repair, or service, the removable mounting portion 42 is disconnected at the joints 44 and 46 and removed to increase accessibility in the aft area 52. For example, the removable mounting portion 42 may be removed to allow a technician to weld the aft frame 60 to the turbine end 58 of the transition piece 34. With the portion 42 removed, the technician has an increased work space, attributed to the freed aft area 52, thereby enabling the technician to more effectively and properly weld the aft frame 60 to the turbine end 58. Likewise, the freed aft area 52 may be beneficial for inspection and repairs. For example, the removed portion 42 may enable the technician to view into the turbine inlet 37 (e.g., turbine nozzle) or other areas otherwise blocked by the portion 42.

FIG. 4 is a perspective view of the transition piece 34 of FIG. 2, illustrating an embodiment of the aft mounting system 35. In the illustrated embodiment, the aft frame 60 has a polygonal shaped framework 80 (e.g., trapezoidal shaped framework) defined by lateral frame portions 82 and 84 and lower and upper frame portions 86 and 88. However, the aft frame 60 may have any suitable shape, such as circular, oval, rectangular, or another shape. Relative to the rotational axis 38 of the turbine system 10 shown in FIG. 2, the lateral frame portions 82 and 84 are circumferentially offset from one another about the axis 38, while the lower and upper frame portions 86 and 88 are radially offset from one another away from the axis 38. Furthermore, the aft flange 62 extends from the upper frame portion 88 radially away from the axis 38. In certain embodiment, the aft frame 60 and aft flange 62 are fixed together as a one-piece structure. For example, the frame 60 and flange 62 may be cast as a single cast part followed by machining. By further example, the frame 60 and flange 62 may be separate parts that are fixed together by a weld, braze, or other permanent connection. Furthermore, the aft frame 60 and transition piece 34 may be fixed together as a one-piece structure. For example, the aft frame 60 and transition piece 34 may be cast as a single cast part followed by machining, or the frame 60 and transition piece 34 may be separate parts that are fixed together by a weld, braze, or other permanent connection.

As illustrated, the removable mounting portion 42 (e.g., the mounting lug 64) is coupled to the aft flange 62 at the first joint 44 via fasteners 66. In particular, the fasteners 66 couple the aft flange 62 to the first end portion 48 (e.g., a transition piece side) of the mounting lug 64. The fasteners 66 include a plurality of bolts 90 and associated nuts 92. Each bolt 90 extends through receptacles 94 in a coupling portion 95 of the aft flange 62 and the first end portion 48 of the mounting lug 64, and then couples to an associated nut 92 to compressively secure the lug 64 to the flange 62. In the illustrated embodiment, a pair of bolts 90 and associated nuts 92 secures the lug 64 to the flange 62. However, any number of bolts 90 and nuts 92 (e.g., 1 to 10) may be used to secure the lug 64 to the flange 62. In some embodiments, the bolts 90 are permanently fixed (e.g., threaded studs) to either the flange 62 or the lug 64, such that only the nuts 92 are removable to separate the lug 64 from the flange 62. In other embodiments, the bolts 90 are removable, while the nuts 92 are replaced with integral threads in the receptacles 94 in the flange 62 and/or lug 64. However, any other removable fasteners 66 may be used to secure the lug 64 to the flange 62.

As further illustrated, the aft flange 62 extends a limited distance 96 radially away from the transition piece 34. The limited distance 96 is sufficient to enable connection between the aft flange 62 and the lug 64, but does not substantially block access while the lug 64 is removed from the flange 62. For example, the limited distance 96 may be approximately 1.5 to 5 times a diameter of the bolts 90. By further example, the limited distance 96 may be less than approximately 1.5, 2, 2.5, 3, 3.5, 4, 4.5, or 5 times the diameter of the bolts 90. In some embodiments, the limited distance 96 may be approximately 1 to 50, 1 to 25, or 1 to 10 percent of the gap 52 between the transition piece 34 and the turbine casing 54. For example, the limited distance 96 may be less than approximately 5, 10, 15, or 20 percent of the gap 52. Thus, upon removal of the lug 64, the gap 52 is substantially open to enable a technician access for inspection, maintenance, or repairs.

In the illustrated embodiment, the aft flange 62 and the mounting lug 64 have a substantially equal width 96, which is substantially less than a width 98 of the upper frame portion 88 of the aft frame 60. For example, the width 96 may be approximately 5 to 100, 5 to 50, 5 to 25, or 5 to 10 percent of the width 98 of the upper frame portion 88. In some embodiments, the widths of the aft flange 62 and the mounting lug 64 may be different from one another. Furthermore, the illustrated flange 62 and lug 64 both have a substantially rectangular shape that is substantially flat. However, other embodiments of the flange 62 and lug 64 may have curved shapes, cylindrical shapes, triangular shapes, or other shapes. For example, the aft flange 62 may have an L-shaped structure or an arcuate structure protruding away from the transition piece 34. Likewise, the lug 64 may curve or extend linearly away from the transition piece 34.

The mounting lug 64 includes an elevation portion 102 between the opposite first and second end portions 48 and 50 corresponding to the first and second joints 44 and 46, respectively. The second joint 46 at the second end portion 50 is offset from the transition piece 34 by the elevation portion 102 to a height or elevation as indicated by the gap 52. Although the illustrated elevation portion 102 is substantially straight, certain embodiments of the elevation portion 102 may have a curved or angled shape. Thus, the length and/or shape of the elevation portion 102 determines the position of the second end portion 50 relative to the transition piece 34. The first and second joints 44 and 46 are separated from one another by an offset distance to enable access to an after area of the combustor transition piece 56 while the mounting lug 64 is removed from the first and second joints 44 and 46. In the illustrated embodiment, the second end portion 50 includes a first rotational joint portion 104 configured to mate with a second rotational joint portion 106 (FIG. 5) to define the second joint 46 as a rotational joint. In particular, the first rotational joint portion 104 includes a cylindrical structure 108 along the second end portion 50, wherein a central bore 110 extends lengthwise through the cylindrical structure 108. As discussed below, the bore 110 receives a shaft to create the rotational joint with the second rotational joint portion 106 (FIG. 5).

Figure 5:
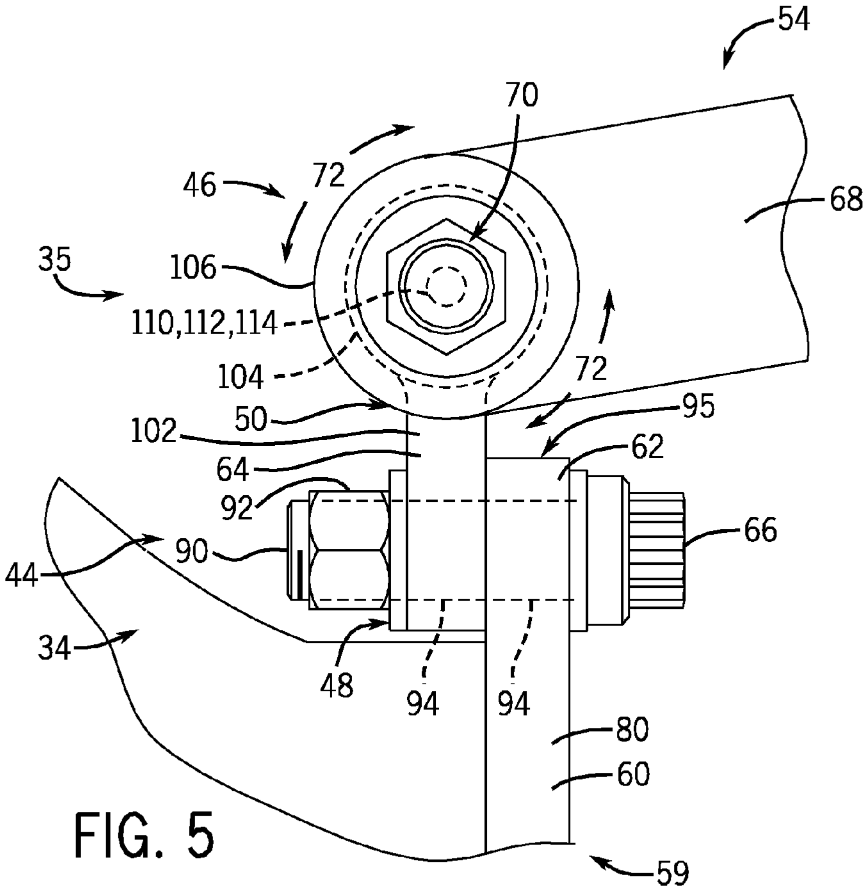
FIG. 5 is a partial cross-sectional side view of the aft mounting system of FIG. 2, taken within line 5-5 of FIG. 2, illustrating the first and second joints of the aft mounting system.

FIG. 5 is a partial cross-sectional side view of the aft mounting system 35 of FIG. 2, taken within line 5-5 of FIG. 2, illustrating details of the first and second joints 44 and 46 at the opposite first and second end portions 48 and 50 of the mounting lug 64. As illustrated, the first joint 44 couples the mounting lug 64 to the aft flange 62 via fasteners 66, while the second joint 46 couples the mounting lug 64 to the bracket 68 via fastener 70. Again, the fasteners 66 include bolts 90 extending through receptacles 94 in the lug 64 and aft flange 62, and secured with nuts 92 to compressively hold the lug 64 to the flange 62. The fastener 70 includes an axial shaft 112 or rotational joint extending through both the first and second rotational joint portions 104 and 106. In particular, the shaft 112 extends through the bore 110 in the cylindrical structure 108 of the first rotational joint portion 104, and also extends through openings 114 in opposite sides of the bracket 68. In the illustrated embodiment, the fastener 70 is a bolt having the shaft 112. Thus, the fastener 70 secures the first and second rotational joint portions 104 and 106 together, while allowing rotational motion as indicated by arrows 72. The second joint 46 also may enable axial and/or circumferential motion of the mounting lug 64 relative to the axis 38 of the turbine system 10.

Figure 6:
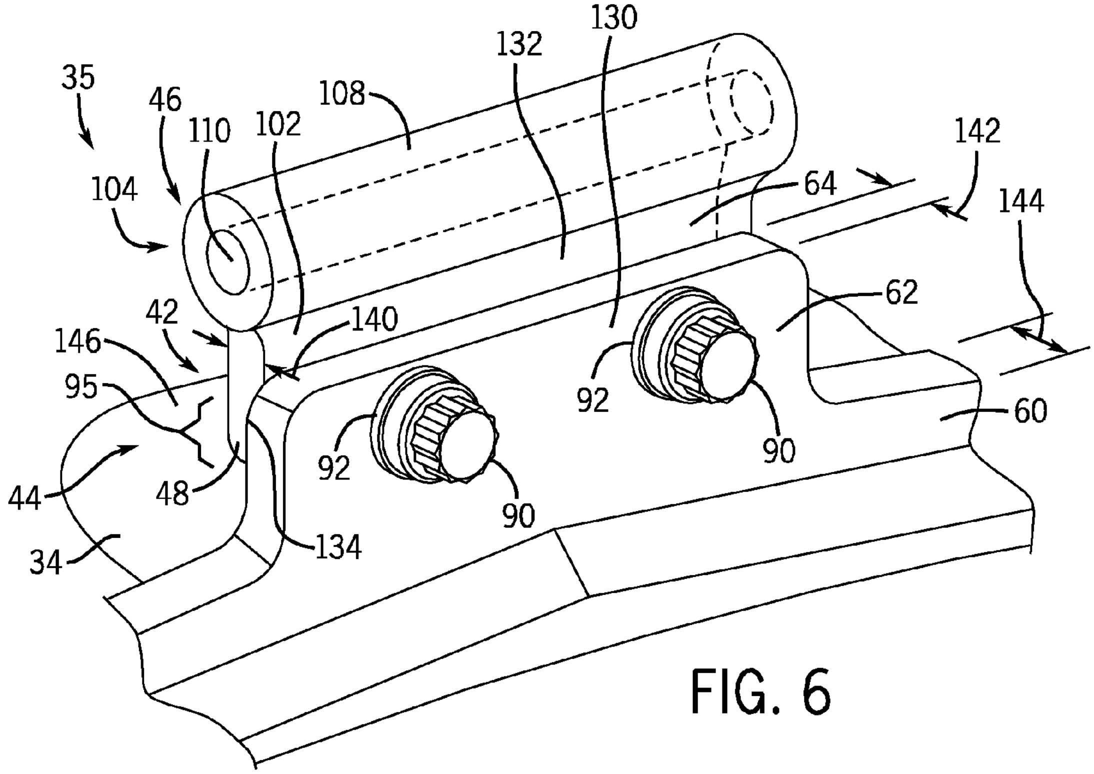
FIG. 6 is a partial perspective view of the aft mounting system of FIG. 2, illustrating the mounting lug selectively coupled to an aft flange of the combustor transition piece.

FIG. 6 is a perspective view of the aft mounting system 35 of FIG. 2, detailing the mounting lug 64 selectively coupled to the aft flange 62. As illustrated, the mounting lug 64 and the aft flange 62 are represented as flat plates 130 and 132, which partially overlap one another along a flat interface 134. The flat plates 130 and 132 may be substantially the same or different from one another. For example, the flat plates 130 and 132 may be made of the same or different materials. By further example, the mounting lug 64 may have a thickness 140 that is substantially similar to a thickness 142 of the aft flange 62. However, in alternative embodiments, the thicknesses 140 and 142 may be different from one another. Additionally, the thickness 142 of the aft flange 62 may be substantially similar to a thickness 144 of the aft frame 60. However, in some embodiments, the thicknesses 142 and 144 may be different from one another. The selectively removable aft mounting system 35 may be removed from the transition piece 34 to expose an underlying area 146 beneath the mounting system 35. Access to the underlying area 146 may be desirable for routine maintenance and repair of the transition piece 34 or the aft frame 60. Upon removal of the bolts 90, the mounting lug 64 may be removed to provide open access to the underlying area 146 of the transition piece 34, which includes the area joining the transition piece 34 to the aft frame 60. Accordingly, a technician can more easily inspect, assembly, repair, or service the area 146. For example, the technician may perform a welding procedure to weld the aft frame 60 to the transition piece 34 while the lug 64 is removed from the aft flange 62.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
- a combustor transition piece configured to mount between a combustor and a turbine of a gas turbine engine, wherein the combustor transition piece comprises:
  - a hollow body comprising an internal flow passage extending from an upstream end portion to a downstream end portion;
  - an aft frame coupled to the downstream end portion of the hollow body;
  - a single aft flange coupled to a portion of the aft frame; and
  - a mounting lug removably coupled to the single aft flange at a first joint, wherein the mounting lug is configured to removably couple to a mounting bracket at a second joint, and at least the second joint comprises a movable joint configured to enable movement of the combustor transition piece relative to the mounting bracket, wherein the movable joint comprises a rotational joint and the first joint comprise a plurality of fasteners.

2. The system of claim 1, wherein the rotational joint has a rotational axis oriented crosswise relative to axes of the plurality of fasteners.

3. The system of claim 1, wherein the plurality of fasteners comprises a plurality of threaded fasteners.

4. The system of claim 1, wherein the single aft flange is fixed to the portion of the aft frame, and the first joint comprises a plurality of removable fasteners.

5. The system of claim 1, wherein the first and second joints are separated from one another by an offset distance to enable access to an aft area of the combustor transition piece while the mounting lug is removed from the first and second joints.

6. The system of claim 1, wherein the system comprises the gas turbine engine having the combustor, the turbine, and the mounting bracket.

7. The system of claim 6, wherein the downstream end portion of the combustor transition piece is offset from the second joint on the mounting bracket by a gap, and the single aft flange extends a distance at least less than approximately 50 percent of the gap.

8. The system of claim 1, wherein the single aft flange and the mounting lug have substantially equal widths.

9. The system of claim 1, wherein a first width of the mounting lug is approximately 5 to 50 percent of a second width of the aft frame at the portion.

10. A system, comprising:
- a combustor transition piece configured to mount between a combustor and a turbine of a gas turbine engine; and
- an aft mounting system, comprising:
  - a removable mounting lug;
  - a first removable joint coupling the removable mounting lug to an aft portion of the combustor transition piece;
  - a mounting bracket; and
  - a second removable joint coupling the removable mounting lug to the mounting bracket, wherein a first width of the removable mounting lug is approximately 5 to 50 percent of a second width of the aft portion, and at least the second removable joint comprises a movable joint configured to enable movement of the combustor transition piece relative to the mounting bracket;
- wherein the movable joint of the second removable joint comprises a rotational joint and wherein the first removable joint comprises a plurality of removable fasteners spaced apart from one another, and the rotational joint has a rotational axis oriented crosswise relative to axes of the plurality of removable fasteners.

11. The system of claim 10, wherein the rotational joint comprises a hinged joint.

12. The system of claim 10, wherein the plurality of removable fasteners comprises a plurality of threaded bolts.

13. The system of claim 10, wherein the aft portion comprises a one-piece aft flange coupled to an aft frame, and the first removable joint comprises a plurality of removable fasteners coupling the removable mounting lug to the one-piece aft flange.

14. The system of claim 10, wherein the first and second removable joints are separated from one another by an offset distance to enable access to an aft area of the combustor transition piece while the removable mounting lug is removed from the first and second removable joints.

15. The system of claim 10, wherein the aft portion of the combustor transition piece is offset from the second removable joint on the mounting bracket by a gap, the aft portion of the combustor transition piece comprises an aft bracket coupled to the removable mounting lug at the first removable joint, and the aft flange extends a distance at least less than approximately 25 percent of the gap.

16. The system of claim 10, wherein the first width of the removable mounting lug is approximately 5 to 25 percent of the second width of the aft portion.

17. The system of claim 10, wherein the first width of the removable mounting lug is approximately 5 to 10 percent of the second width of the aft portion.

18. The system of claim 10, wherein the system comprises the gas turbine engine having the combustor, the turbine, the combustor transition piece, and the aft mounting system.

19. A system, comprising:

an aft mounting system configured to support a combustor transition piece between a combustor and a turbine of a gas turbine engine, wherein the aft mounting system comprises:

a removable mounting lug comprising opposite first and second end portions;

a first joint disposed at the first end portion, wherein the first joint comprises a first removable fastener, and the first joint is configured to removably couple the removable mounting lug to a single aft flange of the combustor transition piece, wherein a first width of the removable mounting lug is approximately 5 to 50 percent of a second width of an aft portion of the combustor transition piece adjacent the single aft flange; and a second joint disposed at the second end portion, wherein the second joint comprises a rotational joint having a second removable fastener, and the second joint is configured to removably couple the removable mounting lug to a mounting bracket on the gas turbine engine.

20. The system of claim 19, wherein the system comprises the combustor transition piece having the aft mounting system.

21. The system of claim 19, wherein the first removable fastener comprises a threaded fastener, and the rotational joint comprises a hinged joint.

* * * * *